United States Patent [19]

Leslie

[11] Patent Number: 4,974,142
[45] Date of Patent: Nov. 27, 1990

[54] BOOTSTRAP DRIVE FOR A SWITCH-MODE POWER CONVERTER

[76] Inventor: Alexander D. Leslie, 316 Amberwood Drive, Waterloo, Ontario N2T 2G1, Canada

[21] Appl. No.: 481,283

[22] Filed: Feb. 20, 1990

[51] Int. Cl.⁵ .......................................... H02M 7/537
[52] U.S. Cl. ..................................... 363/131; 363/16; 363/17; 363/132
[58] Field of Search .................................. 363/15–17, 363/20, 21, 24–26, 61, 131, 132, 134

[56] References Cited

U.S. PATENT DOCUMENTS

| | | | |
|---|---|---|---|
| 4,403,269 | 9/1983 | Carroll | 363/132 |
| 4,585,986 | 4/1986 | Dyer | 363/17 |
| 4,594,649 | 6/1986 | Rhoads et al. | 363/131 |
| 4,736,284 | 4/1988 | Yamagishi et al. | 363/24 |
| 4,754,385 | 6/1988 | McDade et al. | 363/16 |
| 4,908,857 | 3/1990 | Burns et al. | 363/26 |

Primary Examiner—Steven L. Stephan
Assistant Examiner—Jeffrey Sterrett
Attorney, Agent, or Firm—Ridout & Maybee

[57] ABSTRACT

An improved switch-mode power supply having a direct current power source, a transformer, first and second switching transistors in series with the primary winding of the transformer, and drive means for generating signals to switch on the switching transistors. In the improved circuit, a connection is provided through a diode to complete a circuit through the first switching transistor and part of the primary winding on activation of the drive means, drawing energy from a junction between two reservoir capacitors in series. The current from this circuit generates a field in the core of the transformer which is sensed by an auxiliary winding and switches on the second switching transistor, allowing a circuit to be completed through both switching transistors and the entire primary winding of the transformer. In a further embodiment of the circuit, third and fourth switching transistors are also provided in series with the primary winding of the transformer to complete a second circuit through the direct current power source. The drive means sends two series of pulse-width modulated drive pulses, the first series switching on the first switching transistor and the primary winding in one direction, and the second series of pulses, 180° out of phase from the first, switching on the third switching transistor and the primary winding in the opposite direction. A rebalance winding of the transformer and related circuitry are also provided to maintain the reservoir capacitors in balance.

10 Claims, 5 Drawing Sheets

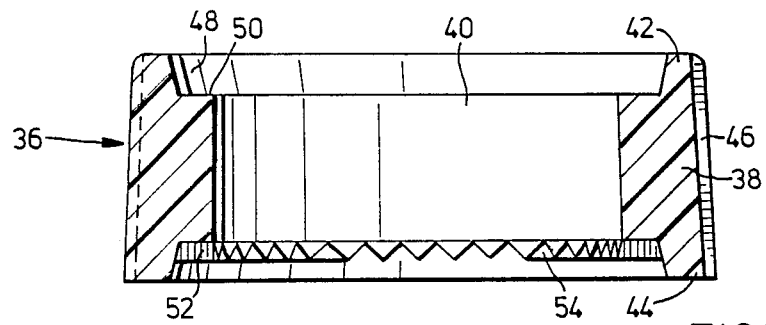
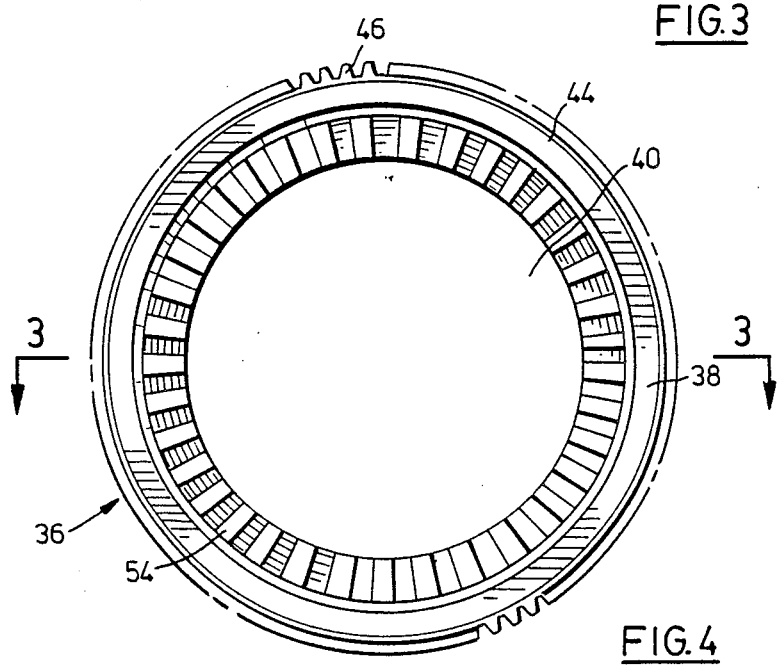
FIG.3
FIG.4

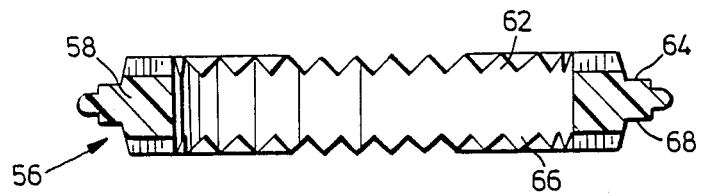
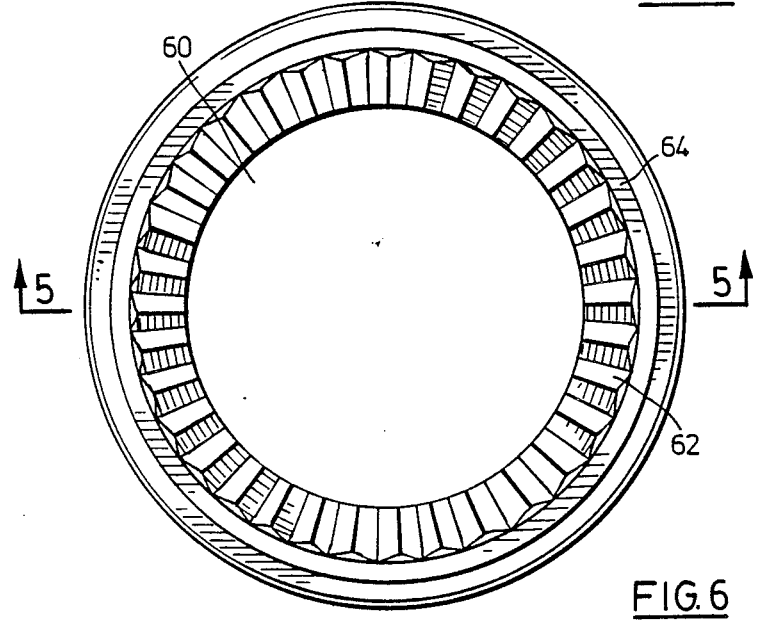
FIG. 5
FIG. 6

BOOTSTRAP DRIVE FOR A SWITCH-MODE POWER CONVERTER

BACKGROUND OF THE INVENTION

1. Field of the Invention

The present invention is directed to a switch-mode power converter, and relates to a switching transistor drive technique which is particularly useful in converters employing limited voltage rating transistors, such as field effect transistors (FETs).

However, converters constructed in accordance with the present invention are adaptable for use in any switch-mode power supply, the limitation on voltage being determined solely by the capacity of the components used.

2. Revue of the Art

As discussed in more detail below with reference to exemplary switch-mode power converters of the above type, certain problems arise in economically and effectively applying control signals to the switching transistors in such converters.

SUMMARY OF THE INVENTION

The switch-mode power converter of the present invention utilizes a simple drive circuit referred to only a single reference potential, and requires drive only to a single transistor.

Accordingly, the present invention is directed to improvements in switch-mode power supplies of the type having a direct current power source, a transformer with a primary winding, at least one secondary winding and a core, first and second switching transistors in series with the primary winding of the transformer, and drive means for generating signals to switch on the switching transistors to complete a circuit through the power source, the switching transistors and the primary winding. The improved drive means, according to the invention, includes first means to switch on the first switching transistor. The improvement, according to the invention, also consists in providing connection means to complete a circuit through the first switching transistor and at least part of the primary winding on activation of the drive means. The current from this circuit generates a field in the core of the transformer, and second means in the drive means is responsive to this field for switching on the second switching transistor, thus completing a circuit through both switching transistors and the whole of the primary winding of the transformer.

Preferably, the second means for switching on the second switching transistor consists of an auxiliary winding on the core of the transformer.

In a common type of switch-mode power supply to which the present invention is advantageously applied, two reservoir capacitors are provided connected in series across the direct current power source, and preferably a connection extends between a tap in the primary winding of the transformer and a junction between the two reservoir capacitors, to enable energy for the circuit through the first switching transistor and at least part of the primary winding to be drawn from this junction. Where necessary to maintain the two reservoir capacitors in balance, means is provided connected to the junction to replace the energy drawn from the junction.

In one embodiment, the means connected to the junction to replace the energy drawn therefrom consists of a rebalance winding on the core of the transformer, preferably with the same number of turns as the portion of the primary winding used in the circuit with the first switching transistor alone, and a diode connecting the rebalance winding with the junction of the two reservoir capacitors which is opposite in polarity to a diode in the connection extending from the tap in the primary winding of the transformer and the same junction between the two reservoir capacitors.

DETAILED DESCRIPTION OF THE PREFERRED EMBODIMENTS

Figure 1:
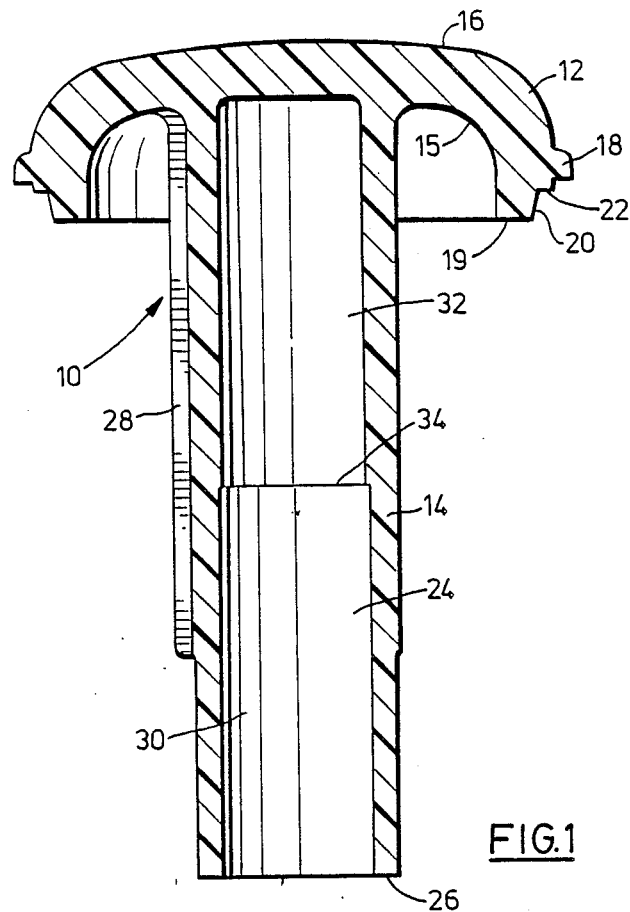
FIGS. 1 and 2 are circuit diagrams of two conventional gate drive techniques for use in forward converters.
Figure 2:
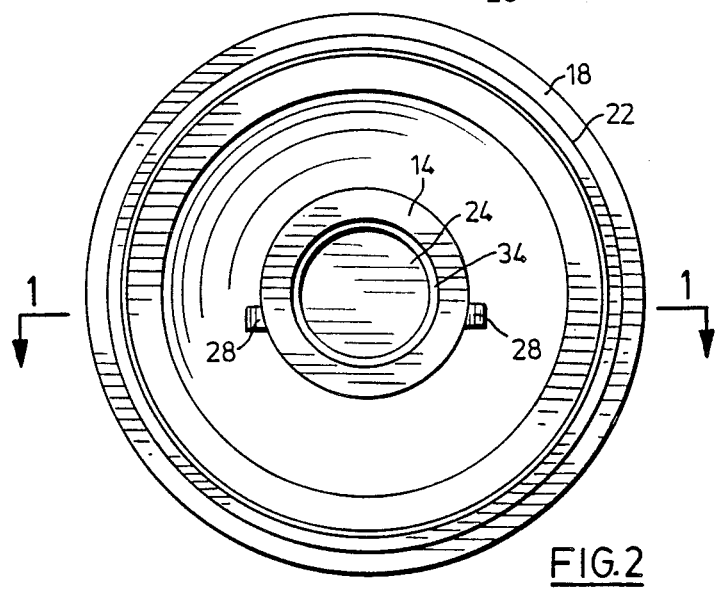
Figure 7:
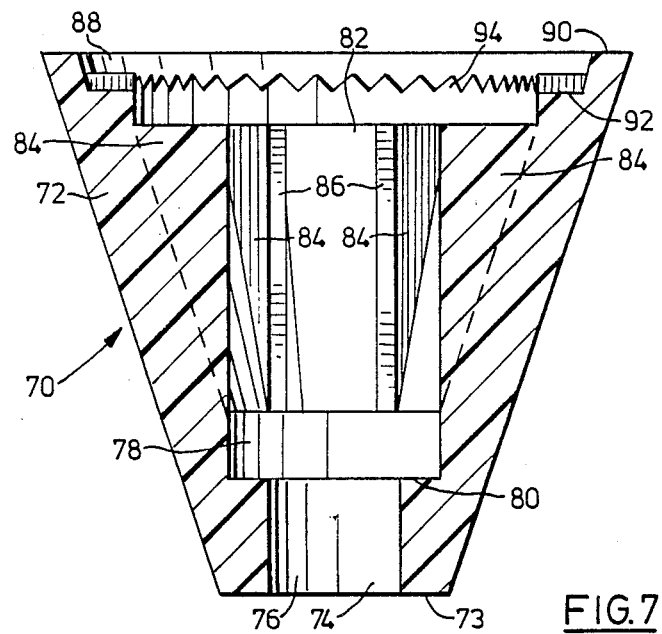
Figure 8:
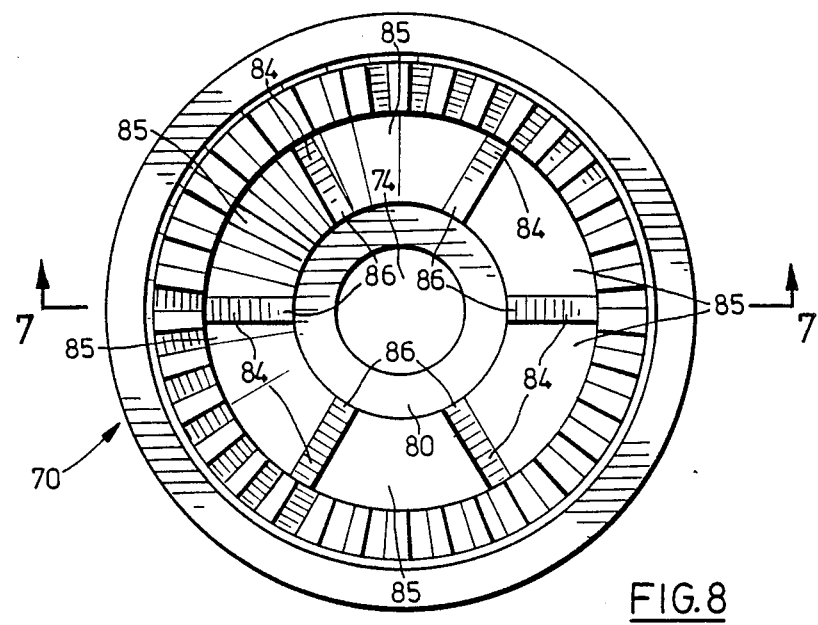
Figure 9:
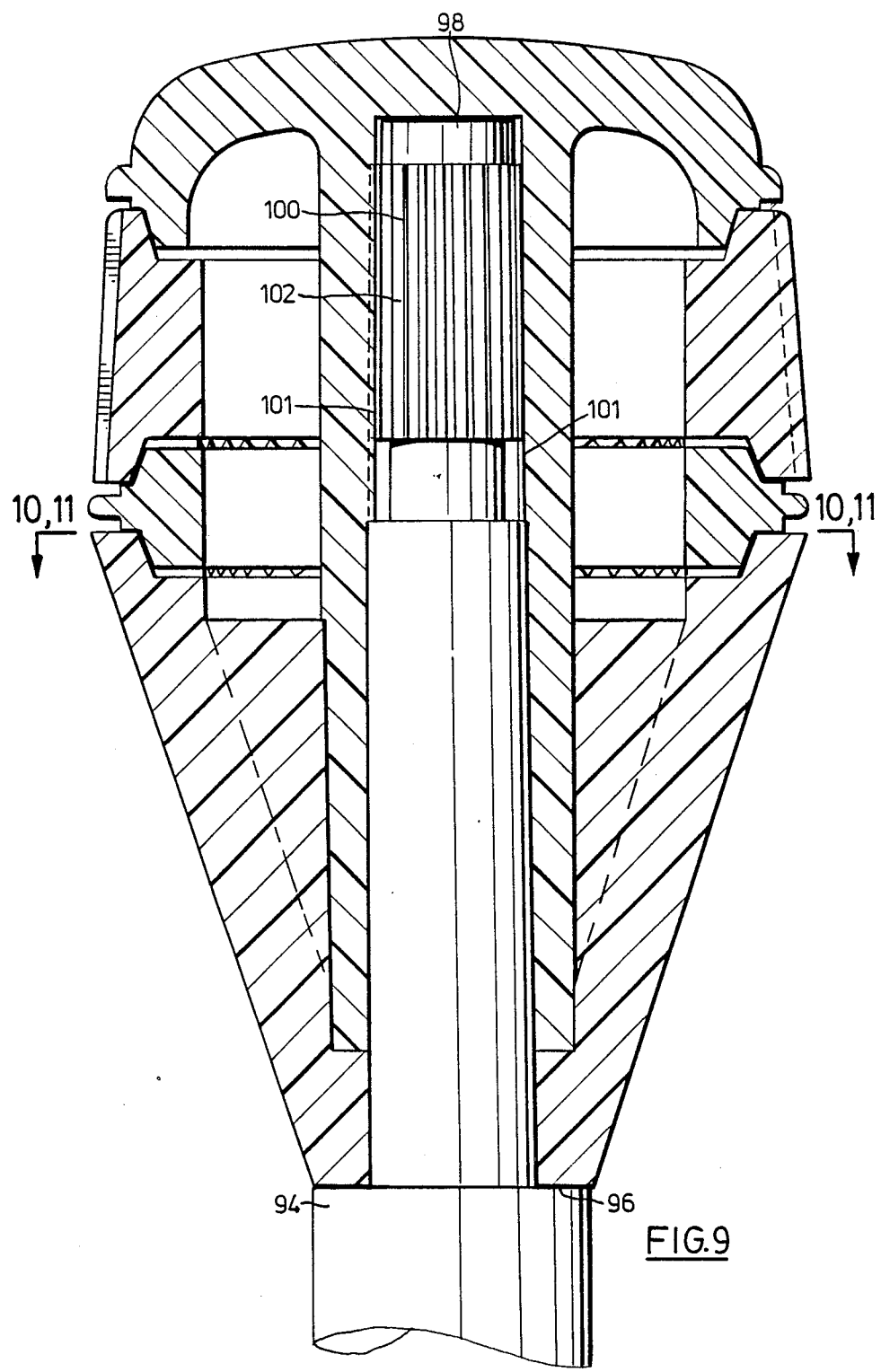
Figure 1:
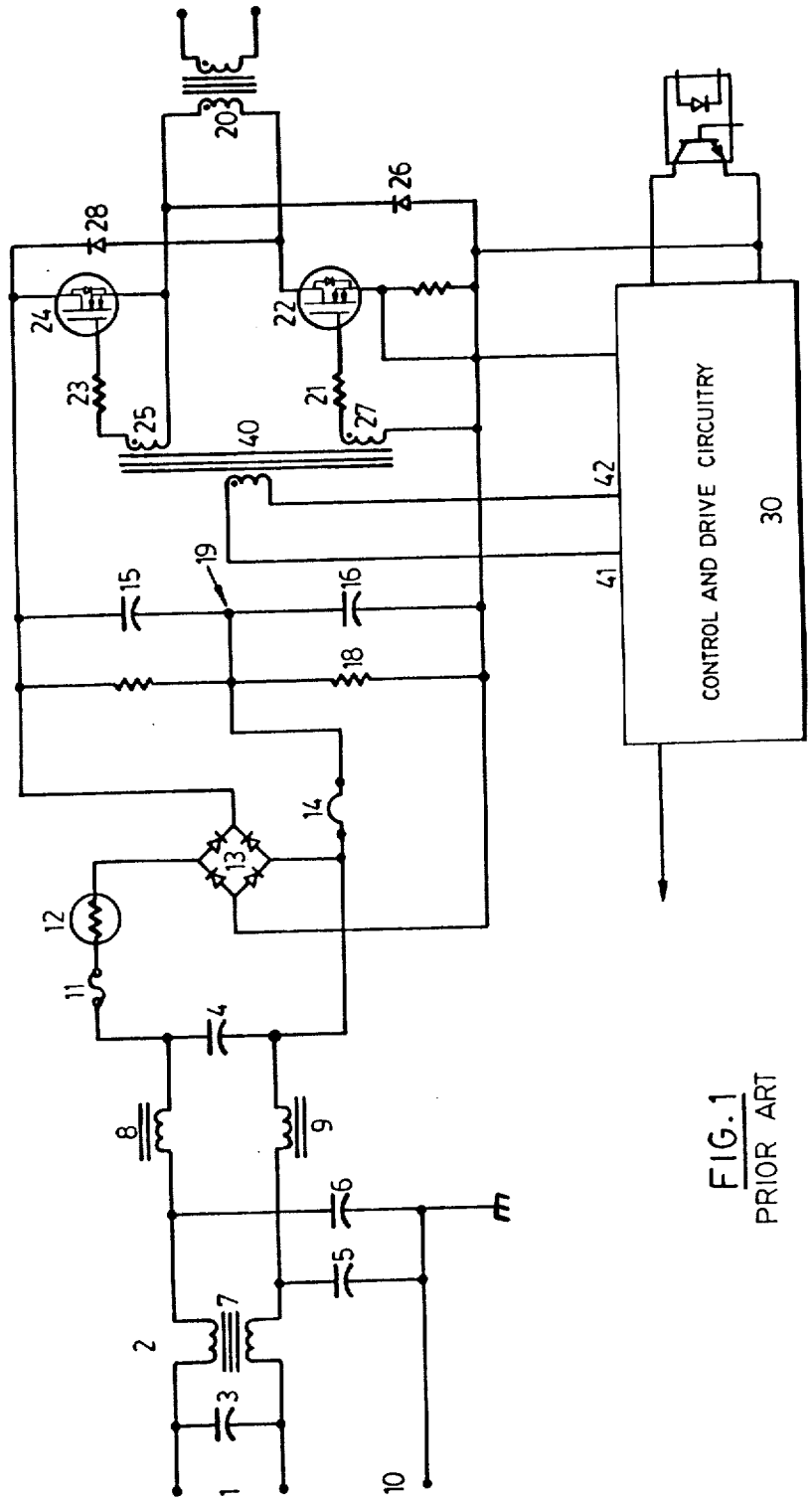
Figure 2:
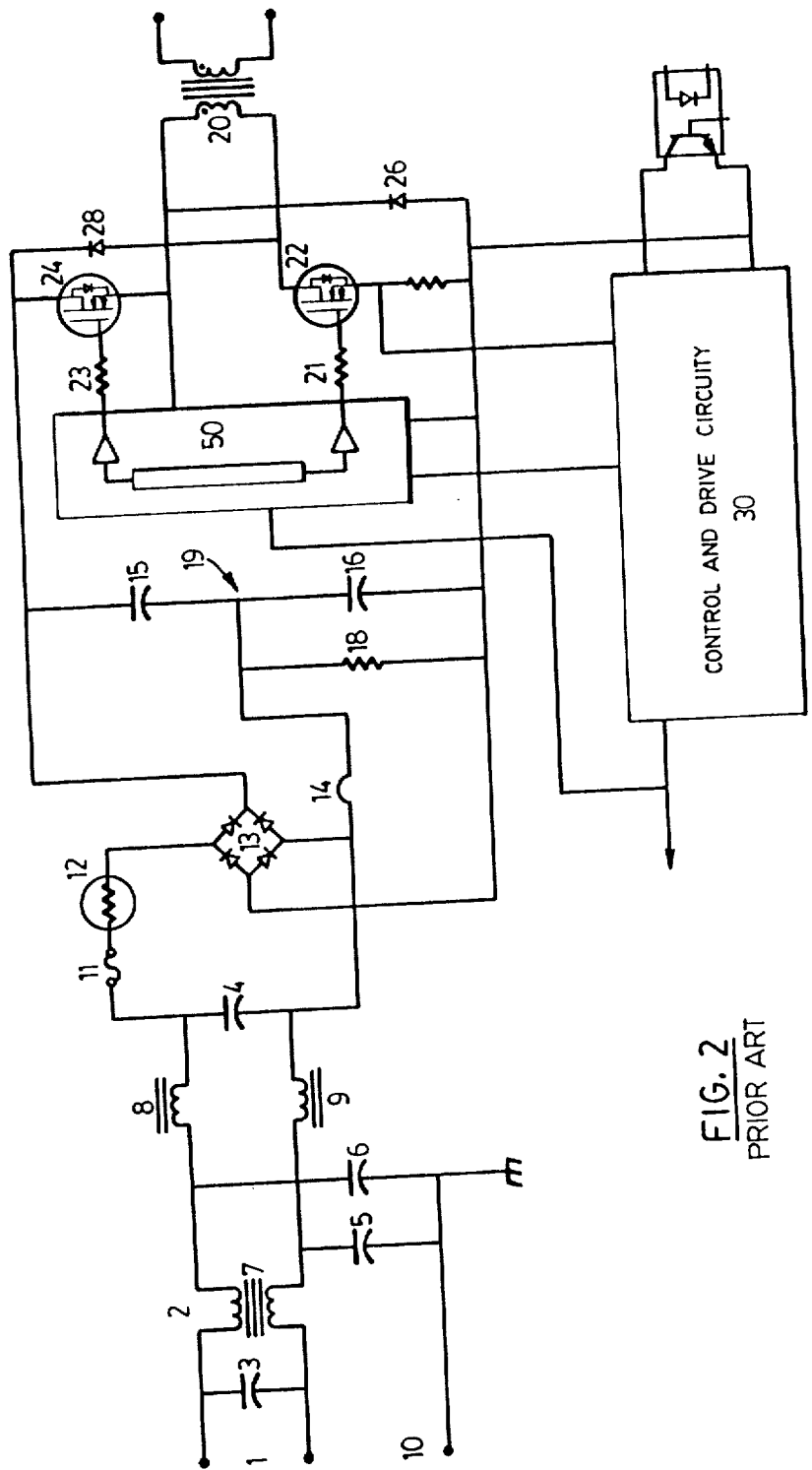
Figure 3:
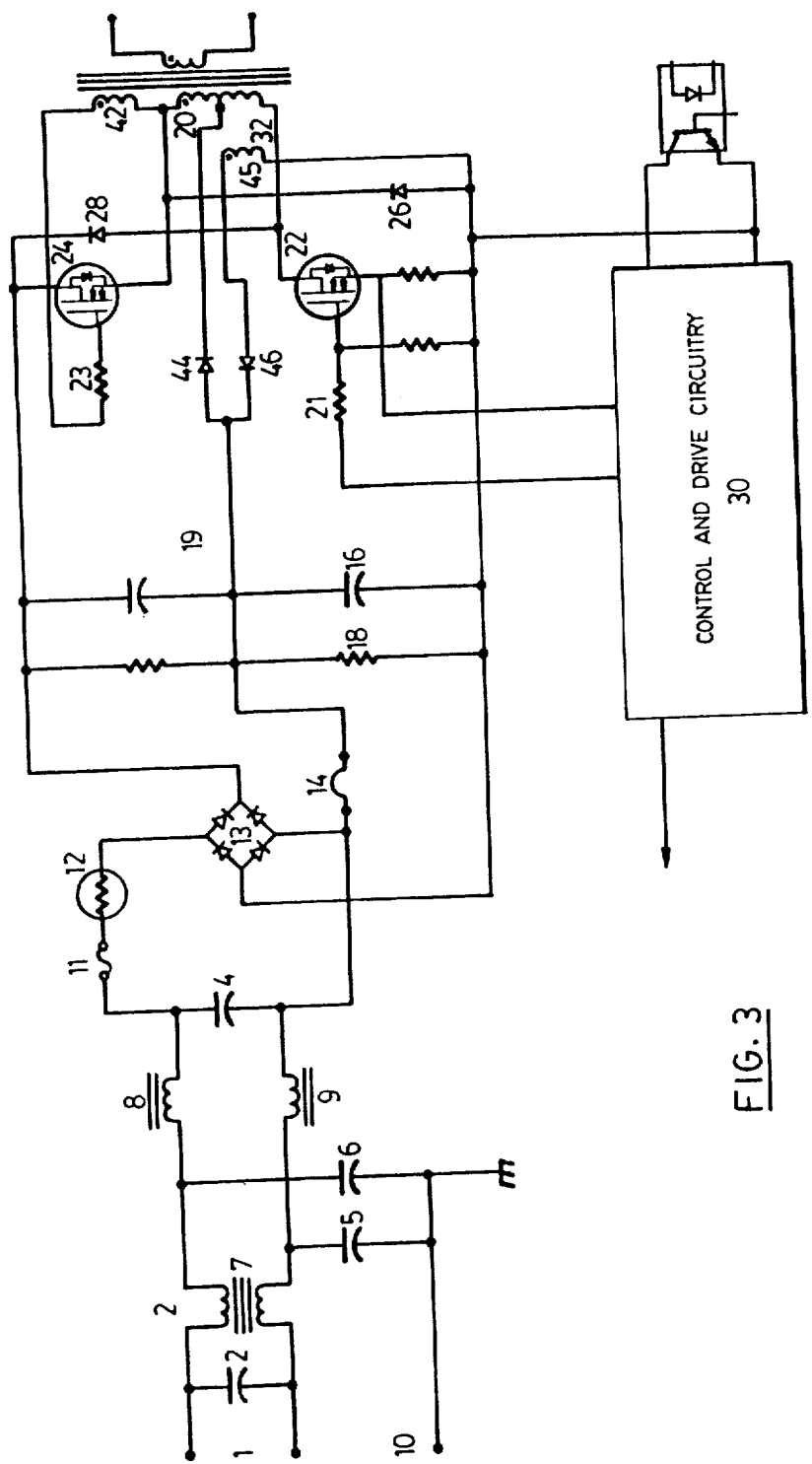
FIG. 3 is a circuit diagram of a forward converter employing the gate drive technique of the present invention.

The circuit diagrams of FIGS. 1, 2 and 3 each relate to a switch-mode converter having an alternating current input 1, with line and neutral leads. In each converter, the alternating current input at supply frequency is first converted to direct current in a conventional manner. The input 1 feeds into an RFI filter circuit 2 having capacitors 3, 4, 5 and 6, and leads 7, 8 and 9. The RFI filter circuit 2 also connects to ground 10. An overcurrent protection fuse 11 is provided, and also a negative temperature coefficient thermistor 12. The thermistor 12 prevents large inrush currents at start-up from opening the fuse 11.

A diode bridge 13 acts as a voltage doubler in conjunction with reservoir capacitors 15 and 16 when link 14 is in place. When link 14 is removed, bridge 13 acts as a straight bridge rectifier, thereby providing a method of switching between 120 volt and 240 volt systems. Resistances 17 and 18 maintain in balance the voltage across junction 19 between reservoir capacitors 15 and 16. The total potential across reservoir capacitors 15 and 16 together may be up to 370 VDC.

In each of FIGS. 1 to 3, a main converter transformer 20 is shown with a primary and one secondary winding only; further secondary windings and associated secondary circuits will vary according to application and can be constructed according to techniques well understood in the art, although a feed back control signal must be generated in accordance with conventional practice.

Two switching transistors 22 and 24 are provided, those shown being field effect transistors (FETs). First switching transistor 22, connected to the negative input rail, and second switching transistor 24, connected to the positive input rail, are both switched on and off responsive to control signals generated by control and drive circuitry 30. Power for the control and drive circuitry 30 comes from an auxiliary power source (not shown), such as a separate low frequency transformer and rectifier, a simple resistor from the high voltage supply (if very little power is required) or an extra winding and rectifier on the main transformer in conjunction with some sort of start-up circuit.

The control and drive circuitry 30 takes the feed back control signal through, for example, an opto-isolator connected to the secondary circuits (not shown), and translates that information into pulse-width modulated output signals. Hence, the duty cycle of the signals output by the control and drive circuitry 30 will be a function of conditions in the secondary circuits and will vary both with input voltage and to some extent output loading of the secondary circuits.

When switching transistors 22 and 24 are turned off, reverse current generated during collapse of the magnetic field in the magnetic transformer core passes through diodes 26 and 28.

One example of a conventional technique to switch transistors 22 and 24 on is shown in FIG. 1. A drive transformer 40 driven by the control and drive circuitry 30 induces voltage across separate secondary windings 25 and 27, to drive gates 22 and 24 through resistances 21 and 23, respectively. The gates of both transistors and the primary transformer 20 are also connected to the control and drive circuitry 30. In such a system, then, the drive circuitry 30 must be able to supply the necessary current to turn the transistors 22 and 24 on and off, and also to supply the magnetizing current of the drive transformer 40. The transformer is expensive and must be constructed carefully to minimize leakage inductance and magnetizing current.

There are also methods to drive the gates of both transistors not using a secondary drive transformer. One such method is shown in FIG. 2. The circuitry must be configured to allow for the switching transistor gates being at very different voltage levels. At least one integrated circuit 50 is available which is specially designed to accomplish this, being International Rectifier IR 2110. One advantage of this technique is that the problems caused by leakage inductance of the system shown in FIG. 1 are eliminated, and the current required to charge the gates is of short duration only, but the specialized integrated circuit is expensive.

One embodiment of a gate drive technique according to the present invention is illustrated in FIG. 3. A simple conventional drive circuit 30 is used, and is connected to only one of the transistor gates, the first switching transistor 22 on the negative input rail. A centre tap 32, added in the primary winding 20 of the transformer, is connected to the junction 19 between the two reservoir capacitors 15 and 16. When the switching transistor 22 is switched on by the control and drive circuitry 30, and begins to conduct, current is drawn from the junction 19 of the reservoir capacitors 15 and 16 through diode 44 and into the primary winding 20 at the centre tap 32. The circuit through the first switching transistor 22 is thus completed through only part of the primary winding 20. The voltage from the centre tap 32 across the half portion of the primary winding 20 generates a field in the core of the transformer, which in turn induces in a voltage appearing across the auxiliary winding 42 connected through resistance 23 to the gate of the second switching transistor 24 on the positive input rail. After switching transistor 24 turns on, a circuit is completed through both switching transistors and the total primary winding 20.

When the first switching transistor 22 is initially switched on at the beginning of a switching cycle, the resulting current flows through only half the primary winding 20, therefore resulting in approximately twice the normal primary current flowing through first switching transistor 22 until second switching transistor 24 can be activated through auxiliary winding 42 to switch on. Since first switching transistor 22 is continually extracting charge from reservoir capacitor 16 at the beginning of each switching cycle, the voltage balance across reservoir capacitors 15 and 16 will be altered to the point where, in some cases, resistances 17 and 18 will not be able to maintain the balance at junction 19 at a reasonable level.

In order to prevent imbalance, means to replace the energy drawn from junction 19, and thus rebalance the reservoir capacitors 15 and 16, are provided. A rebalance winding 45 with half the number of turns of the primary winding of the transformer 20 (i.e. the same number of turns as half the primary winding from centre tap 32) is added to the transformer core, and the output is peak rectified through diode 46 which is oppositely polarized to diode 44.

This additional rebalance circuitry may not be required for lower power levels or where a secondary regulation is provided which delays the flow of current in the secondary current flow, as in, for example, magnetic regulators.

It has been found that when link 14 is in place to create a voltage doubler circuit, a ripple voltage is introduced at junction 19, and for a small portion of the line frequency cycle, the voltage on capacitor 16 is greater than on capacitor 15. This means that despite the fact that there is appropriate gate voltage applied to transistor 24 it will not conduct current if the voltage induced by transformer action the top portion of the primary winding on the transformer when the transistor 22 turns on is sufficient that the voltage that exists on the drain of the transistor 24 becomes greater than the voltage on the source. In order to avoid this problem in the circuit as shown in FIG. 3, capacitors 15 and 16 must be made large enough that the ripple voltage remains very small, even when the converter is operating at maximum power, which could result in capacitors several times larger than would normally be required.

One alternative approach is to draw sufficient current from the junction 19 (for example to supply the control circuitry) to ensure that the voltage on capacitor 16 never exceeds that on capacitor 15.

Figure 5:
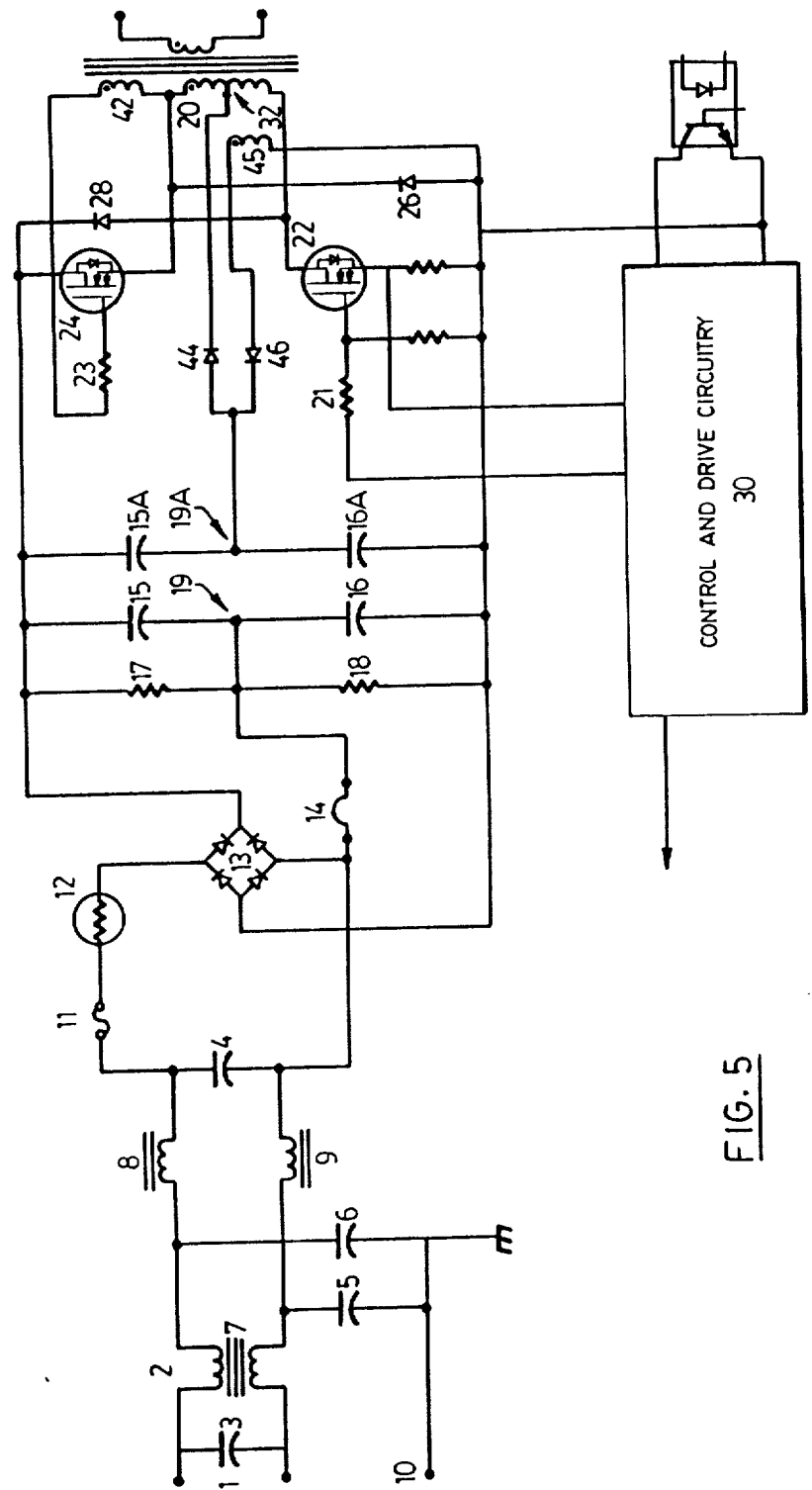
FIG. 5 is a modification of the circuit diagram of FIG. 3.

A further modified arrangement is illustrated in FIG. 5, wherein two secondary reservoir capacitors 15a and 16a are added in series connected across the main D.C. power rails but with their junction 19a not joined to the junction 19 of capacitor 15 and 16. The junction 19a of these two secondary capacitors is connected to diodes 44 and 46. Capacitors 15a and 16a may be very much smaller than capacitors 15 and 16 since they need only to be able to provide the intermittent current required to initiate the conduction cycle.

The circuitry shown in FIG. 3 may also be used for flyback converters, and would be especially useful for discontinuous types when the initial primary current is essentially zero. The primary circuitry for a flyback converter would be substantially the same as shown in FIG. 3, with obvious modifications to effect the desired output.

Figure 4:
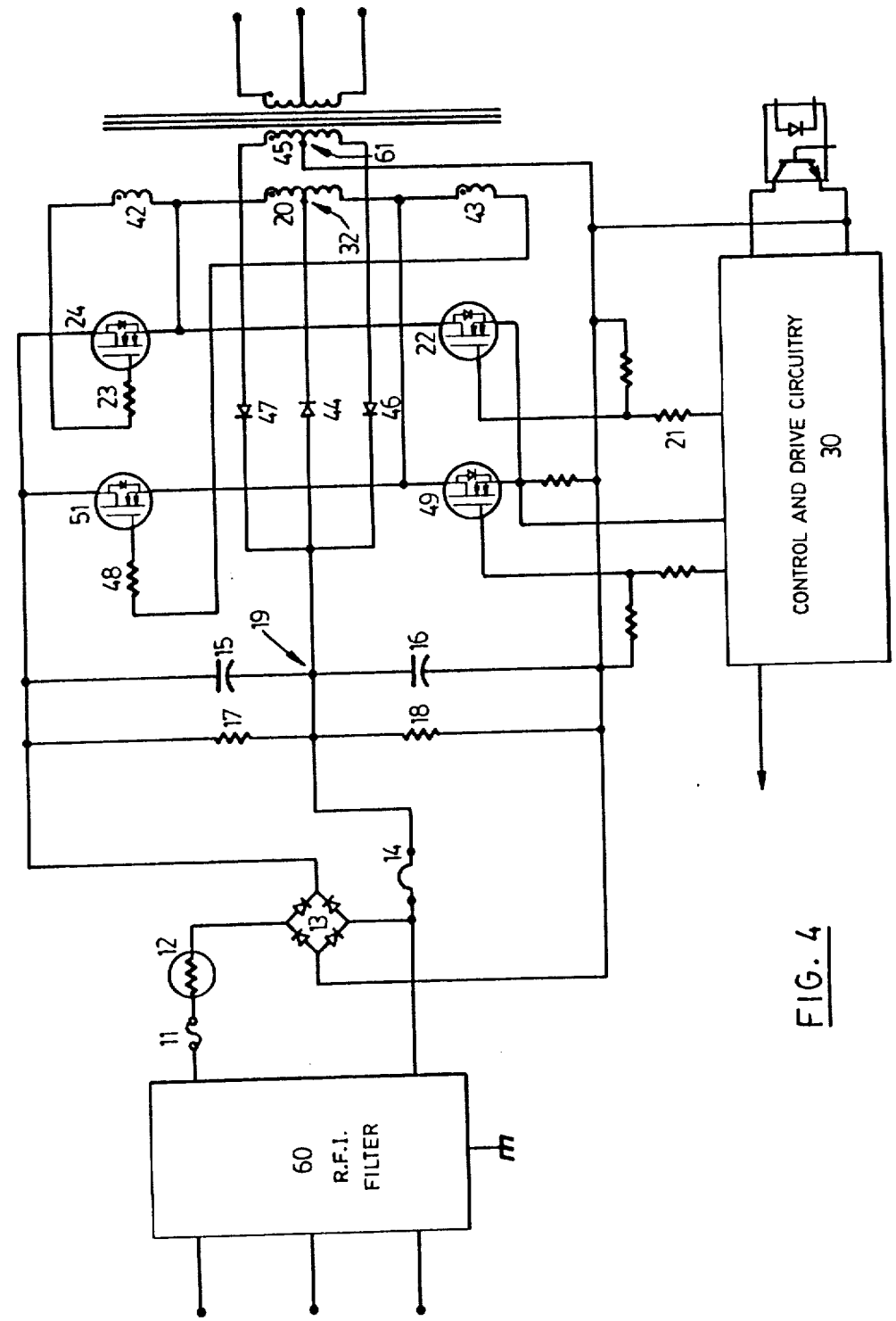
FIG. 4 is a modification of the circuit diagram of FIG. 3 showing application of the present invention in a push-pull converter.

FIG. 4 shows circuitry for use in a full bridge push-pull converter containing two separate circuits through a RFI filter 60 and the primary winding 20 of the transformer.

One circuit, through first and second switching transistors 22 and 24 and the primary winding 20, operates on receiving a first series of pulse-width modulated drive pulses from the control and drive circuitry 30 in the manner described above in relation to FIG. 3.

A second circuit, through third and fourth switching transistors 44 and 46 and the primary winding 20 of the transformer, operates 180° out of phase from the first circuit and in the opposite direction through the primary winding 20 from the current flow of the first circuit. To initiate current through the second circuit, a second series of pulse-width drive pulses from the control and drive circuitry 30, 180° out of phase from the first series, switches on third switching transistor 49 and initiates a current draw from the junction 19 of the two reservoir capacitors 15 and 16, to complete a circuit through the centre tap 32 and across the other half of the primary winding from that used in the initial start-up phase of the first circuit. The resulting field generated in the transformer core is opposite in polarity to the field generated in the first circuit start-up, and the oppositely-polarized field generates a voltage across a second auxiliary winding 43 which switches on the fourth switching transistor 51 through resistance 48, thus completing the second circuit through the third and fourth switching transistors 49 and 51, and the whole of the primary winding 20.

In full operation, as the first and third switching transistors 22 and 49 are driven from the control and drive circuitry 30 180° out of phase, the current is drawn through the centre tap 32 to alternately pass through each half of the primary winding 20, and voltage is alternately induced across auxiliary windings 42 and 43 in order to activate the second and fourth transistors 24 and 46 180° out of phase, to complete their respective circuits.

In such a system, the rebalance circuit is full wave rectified through diodes 46 and 47. The rebalance winding 45' is provided with the same number of turns as the whole of the primary winding 20 of the transformer, and has a centre tap 61 connected to the negative supply rail to allow alternate completion of rebalance circuits for the first and second circuits.

For a full bridge circuit, some form of symmetry correction is required as is known to keep the core from entering saturation over several cycles, such as by current mode control incorporated into control circuitry (not shown).

Similar secondary capacitors 15a and 16a as illustrated in FIG. 5 may be added in the circuit illustrated in FIG. 4 to avoid the problem with ripple voltage at higher output power levels as already discussed above.

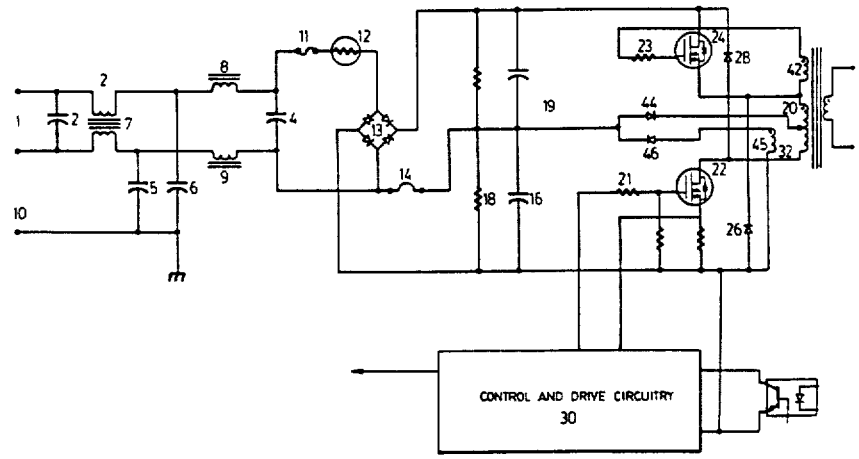

I claim:

1. In a switch-mode power supply of the type having:
   a direct current power source;
   a transformer with a primary winding, at least one secondary winding and a core;
   first and second switching transistors in series with the primary winding of the transformer; and
   drive means for generating signals to switch on the switching transistors to complete a circuit through the direct current power source, the switching transistors and the primary winding, the improvement wherein:
   connection means are provided to complete a circuit through the first switching transistor and at least part of the primary winding on activation of the drive means, current therefrom generating a field in the core of the transformer; and
   the drive means comprises first means to turn on the first switching transistor, and second means responsive to the field generated in the core of the transformer for switching on the second switching transistor, thereby completing a circuit through both switching transistors and the whole of the primary winding of the transformer.

2. A switch-mode power supply according to claim 1, wherein the second means for switching on the second switching transistor comprises an auxiliary winding on the core of the transformer.

3. A switch-mode power supply according to claim 1, further having two first reservoir capacitors in series connected to the direct current power source, and wherein the connection means comprises:
   a connection extending between a tap in the primary winding of the transformer and a junction between the two first reservoir capacitors, whereby energy for the circuit through the first switching transistor and at least part of the primary winding is drawn from said junction; and
   means connected to said junction to replace said energy drawn from said junction, whereby to maintain the two reservoir capacitors in balance.

4. A switch-mode power supply, according to claim 3, wherein the direct current power source is a voltage doubler circuit comprising further voltage doubler reservoir capacitors connected in series at a junction, the series connected voltage doubler reservoir capacitors being connected to the source in parallel with said series connected first reservoir capacitors, and the junction between the first reservoir capacitors being isolated from the junction between the further reservoir capacitors.

5. A switch-mode power supply according to claim 3, wherein the connection comprises a first diode polarized to permit the desired current flow, and the means connected to said junction to replace said energy comprises:
   a rebalance winding on the core of the transformer; and
   means connecting the rebalance winding with the junction of the two reservoir capacitors, said means comprising a second diode of opposite polarity to the first diode.

6. A switch-mode power supply according to claim 5, wherein the rebalance winding has the same number of turns as said at least part of the primary winding of the transformer.

7. A switch-mode power supply according to claim 5, having:
   third and fourth switching transistors in series with the primary winding of the transformer to complete a circuit through the direct current power source, the third and fourth switching transistors and the primary winding in which the direction of current flow through the primary winding is opposite to that in the circuit through the first and second switching transistors and the primary winding; and
   drive means for generating signals to switch on the third and fourth switching transistors, when the first and second transistors are switched off;
   the connection means completing a circuit through the third switching transistor and at least part of the primary winding on activation of the drive means for generating a signal to switch on the third switching transistor, current therefrom generating a field in the core of the transformer opposite in polarity to that generated by current through the first switching transistor;

means responsive to said oppositely polarized field in the core of the transformer for switching on the fourth switching transistor, thereby completing a circuit through the third and fourth switching transistors and the whole of the primary winding of the transformer when the circuit completed through the first and second switching transistors and the whole of the primary winding of the transformer has been turned off.

8. A switch-mode power supply, according to claim 7, wherein the drive means for switching on the first and third switching transistors comprises a single source of pulse-width modulated signals providing two series of pulse-width modulated drive pulses, each series being 180° out of phase with the other.

9. A switch-mode power supply, according to claim 8, wherein the means for switching on the second and fourth switching transistors comprise, respectively, first and second auxiliary windings on the transformer.

10. A switch-mode power supply according to claim 1, wherein the first means of the drive means comprises a source of pulse-width modulated drive pulses.

* * * * *

UNITED STATES PATENT AND TRADEMARK OFFICE
CERTIFICATE OF CORRECTION

PATENT NO. : 4,974,142

DATED : November 27, 1990

INVENTOR(S) : Alexander D. Leslie

It is certified that error appears in the above-identified patent and that said Letters Patent is hereby corrected as shown below:

The title page, should be deleted to be replaced with the attached title page.

The drawing sheets, consisting of Figs. 1 - 9, should be deleted to be replaced with the drawing sheets, consisting of Figs. 1 - 5, as shown on the attached pages.

Signed and Sealed this

Sixth Day of July, 1993

Attest:

MICHAEL K. KIRK

Attesting Officer

Acting Commissioner of Patents and Trademarks

United States Patent [19]

Leslie

[11] Patent Number: 4,974,142

[45] Date of Patent: Nov. 27, 1990

[54] BOOTSTRAP DRIVE FOR A SWITCH-MODE POWER CONVERTER

[76] Inventor: Alexander D. Leslie, 316 Amberwood Drive, Waterloo, Ontario N2T 2G1, Canada

[21] Appl. No.: 481,283

[22] Filed: Feb. 20, 1990

[51] Int. Cl.⁵ .............................................. H02M 7/537
[52] U.S. Cl. ....................................... 363/131; 363/16; 363/17; 363/132
[58] Field of Search .................................... 363/15–17, 363/20, 21, 24–26, 61, 131, 132, 134

[56] References Cited

U.S. PATENT DOCUMENTS

| | | | |
|---|---|---|---|
| 4,403,269 | 9/1983 | Carroll | 363/132 |
| 4,585,986 | 4/1986 | Dyer | 363/17 |
| 4,594,649 | 6/1986 | Rhoads et al. | 363/131 |
| 4,736,284 | 4/1988 | Yamagishi et al. | 363/24 |
| 4,754,385 | 6/1988 | McDade et al. | 363/16 |
| 4,908,857 | 3/1990 | Burns et al. | 363/26 |

Primary Examiner—Steven L. Stephan
Assistant Examiner—Jeffrey Sterrett
Attorney, Agent, or Firm—Ridout & Maybee

[57] ABSTRACT

An improved switch-mode power supply having a direct current power source, a transformer, first and second switching transistors in series with the primary winding of the transformer, and drive means for generating signals to switch on the switching transistors. In the improved circuit, a connection is provided through a diode to complete a circuit through the first switching transistor and part of the primary winding on activation of the drive means, drawing energy from a junction between two reservoir capacitors in series. The current from this circuit generates a field in the core of the transformer which is sensed by an auxiliary winding and switches on the second switching transistor, allowing a circuit to be completed through both switching transistors and the entire primary winding of the transformer. In a further embodiment of the circuit, third and fourth switching transistors are also provided in series with the primary winding of the transformer to complete a second circuit through the direct current power source. The drive means sends two series of pulse-width modulated drive pulses, the first series switching on the first switching transistor and the primary winding in one direction, and the second series of pulses, 180° out of phase from the first, switching on the third switching transistor and the primary winding in the opposite direction. A rebalance winding of the transformer and related circuitry are also provided to maintain the reservoir capacitors in balance.

10 Claims, 5 Drawing Sheets